Patented Aug. 24, 1937

2,091,201

UNITED STATES PATENT OFFICE 2,091,201

PROCEDURE FOR THE PURIFICATION AND SOFTENING OF WATER

Fritz Hähn, Cologne-Mulheim, Germany

No Drawing. Application May 31, 1933, Serial No. 673,791. Renewed July 21, 1937. In Germany June 1, 1932

4 Claims. (Cl. 210—23)

The invention relates to a process for the purification and softening of water by means of alkalis, of caustic potash or carbonate alkalis, and metal salts. Hitherto, as metal salt aluminium sulphate or iron sulphate has been used. The invention is based upon the observation that in using copper sulphate in small quantities, up to about 0.05 gram per liter of water, the reaction and therewith the clarifying is very much accelerated and to such a degree that the time of reaction is shortened in a relation of about 1:100. Besides, also a complete discoloration of the water is simultaneously obtained in the same short time, when treating colored water.

Instead of copper sulphate can be used other copper-salts and also chrome- and nickel-salts.

It is known that copper sulphate can be used for the sterilization of bacillus carrying water by killing of bacillus. It has been proposed to use iron sulphate together with copper sulphate in order to accelerate the precipitation in water which contains heavy materials and unhealthy bacillus by coagulation thereby killing the bacillus, said method being cheaper for both purposes than the use of copper sulphate. In this connection has also been recommended a small addition of lime, in order to free the water from iron and copper. This does not apply to water purification for drinking purposes in which the new effect for softening of water does not enter, namely, of copper bound for exclusive use of small quantities of copper sulphate together with a sufficient quantity of alkali. That in both cases a clarification is obtained cannot alter the principal difference of the old and new processes. For water softening and discoloration of colored water, according to the present invention the use of copper sulphate represents a novel process for technical treatment.

The superiority of the copper sulphate in comparison with aluminium sulphate as well as the iron sulphate, at the softening and clarifying of water by treating with alkalis has been proved by a great number of experiments.

It has been found that in adding copper sulphate to a certain quantity of water equivalent to the usual addition of aluminium sulphate, and with an undetermined quantity of an alkali, preferably lime, the precipitation of the sediment takes place much quicker and more completely than in using aluminium sulphate with an equal addition of an alkali. Further it has been proved irrefutably that even a much smaller quantity of copper sulphate, corresponding to the usual addition of aluminium sulphate, will still be effective in cases where the aluminium sulphate will practically seem ineffective. The experiments showed besides that the clearing effect in using as previously proposed aluminium sulphate during the identical reaction time is not attained so completely by the use of copper sulphate, even with alkali in excess.

The superiority of the copper sulphate in comparison with the aluminium sulphate also applies to other copper salts and chrome- and nickel-salts as well as to iron sulphate.

What I claim is:

1. Process for the softening and simultaneous clarifying of water comprising treatment with substances of strong alkaline character and metal salts, the metal salt consisting of copper-sulphate, said substances consisting of lime and caustic soda in sufficient amount to soften the water and remove the excess metal arising from said metal salts.

2. Process for the softening and simultaneous clarifying of water comprising treatment with substances of strong alkaline character and metal salts, the metal salts consisting of copper-sulphate and said substances consisting of soda, caustic lime, caustic soda and carbonate alkali in sufficient amount to soften the water and remove the excess metal arising from said metal salts; and the quantity of metal salt used being between 0.01 and 0.05 gram per liter.

3. Process according to claim 1 in which the amount of said substance of strong alkaline character corresponds to the carbonate hardness and the amount thereof being equivalent to $Ca(OH)_2$.

4. Process according to claim 1 in which the metal salt consists of sulphate of copper in the amount of about 0.05 gram per liter and the amount of substance of strong alkaline character corresponds to the carbonate hardness and the amount thereof being equivalent to $Ca(OH)_2$.

FRITZ HÄHN.